United States Patent
Szarmes et al.

(10) Patent No.: US 7,433,044 B1
(45) Date of Patent: Oct. 7, 2008

(54) SAGNAC FOURIER TRANSFORM SPECTROMETER HAVING IMPROVED RESOLUTION

(75) Inventors: Eric Szarmes, Honolulu, HI (US); Huan Ma, Honolulu, HI (US)

(73) Assignee: University of Hawaii, Honolulu, HI (US)

(*) Notice: Subject to any disclaimer, the term of this patent is extended or adjusted under 35 U.S.C. 154(b) by 406 days.

(21) Appl. No.: 11/145,164

(22) Filed: Jun. 3, 2005

Related U.S. Application Data (60) Provisional application No. 60/577,512, filed on Jun. 4, 2004.

(51) Int. Cl.
*G01B 9/02* (2006.01)
*G01J 3/45* (2006.01)

(52) U.S. Cl. .................................................... 356/451
(58) Field of Classification Search ......... 356/451–456; 250/339.07, 339.08, 339.09
See application file for complete search history.

(56) References Cited

U.S. PATENT DOCUMENTS

| | | | | |
|---|---|---|---|---|
| 3,765,769 A | * | 10/1973 | Treacy | ........................ 356/305 |
| 5,059,027 A | | 10/1991 | Roesler et al. | |
| 5,684,582 A | * | 11/1997 | Eastman et al. | ............. 356/328 |
| 5,761,225 A | | 6/1998 | Fidric et al. | |
| 5,777,736 A | | 7/1998 | Horton | |
| 6,108,082 A | * | 8/2000 | Pettipiece et al. | ............ 356/301 |
| 6,687,007 B1 | * | 2/2004 | Meigs | ......................... 356/456 |
| 7,167,249 B1 | * | 1/2007 | Otten, III | .................... 356/456 |
| 2006/0290938 A1 | * | 12/2006 | Heintzann et al. | ........... 356/456 |

OTHER PUBLICATIONS

A.E. Siegman, "Lasers," University Science Books, Mill Valley, CA 1986, FIG. 23.10, p. 905.
Harlander, John M. et al., "Spatial Heterodyne Spectroscopy for High Spectral Resolution Space-Based Remote Sensing," Optics and Photonics News, Jan. 2004, pp. 46-51.
Office Action (U.S. Appl. No. 11/431936,)- Apr. 28, 2008.

* cited by examiner

*Primary Examiner*—Patrick J Connolly
(74) *Attorney, Agent, or Firm*—Knobbe, Martens, Olson & Bear, LLP (57) ABSTRACT

A Fourier transform spectrometer based on a modified Sagnac interferometer is described. The instrument uses one or more gratings as dispersive elements to greatly improve the spectral resolution, and in-line optics to match the beam size in the interferometer to optimize the efficiency. The resolution can approach about 0.6 GHz at about 632.8 nm ($\lambda/\Delta\lambda = 8.4 \times 10^5$). A CCD or photodiode array is used as the detector and the fast Fourier transform of the fringe pattern is performed by a computer. Some embodiments employ no mechanically moving parts; therefore, they are compact and easy to align. Practical applications include remote sensing, process monitoring, and basic research. The fast response time of the detector also allows real time spectral analysis.

25 Claims, 13 Drawing Sheets

SAGNAC FOURIER TRANSFORM SPECTROMETER HAVING IMPROVED RESOLUTION

REFERENCE TO RELATED APPLICATIONS

The present application claims a priority benefit of U.S. Provisional Patent Application Ser. No. 60/577,512, filed on Jun. 4, 2004, titled "Double-grating sagnac fourier transform spectrometer," which is hereby incorporated by reference herein in its entirety.

GOVERNMENT LICENSE RIGHTS UNDER 35 U.S.C. § 202(C)6

The U.S. Government has a paid-up license in this invention and the right in limited circumstances to require the patent owner to license others on reasonable terms as provided for by the terms of contract No. DASG60-02-C-0048 awarded by DOD-Army SMDC.

FIELD OF THE INVENTION

The present disclosure relates to the field of spectrometers, and more specifically to improving resolution in interference spectrometers.

BACKGROUND

Fourier transform spectroscopy is a known technique. Conventional Fourier transform spectrometers (FTSs) often use a scanning mirror with a high precision moving mechanism. To get the high resolution spectrum, conventional FTSs use a long scanning path. Thus, acquisition of desired data generally takes a long scanning time. Moreover, traditional FTSs are large and complicated instruments. Embodiments of the present disclosure seek to overcome some or all of these and other problems.

SUMMARY

In embodiments of the disclosed system, a Sagnac interferometer with internal dispersion is employed. In some embodiments, the interferometer includes no moving parts, thereby making the instrument small and stable. A detector array is used to record the interferogram, and the fast Fourier transform is performed by a computing device to obtain the spectrum of the light source. In various embodiments, the spectrum is recorded at one instant instead of being scanned over time; therefore, the data acquisition time is far less than the scanning time in the conventional Fourier transform spectrometer. In an embodiment, the scanning time depends on the response time of the detector and the electronics. Typical response may range from about milliseconds to about microseconds, and response times in the about nanosecond range are possible.

For purposes of summarizing the invention, certain aspects, advantages and novel features of the disclosure have been described herein. Of course, it is to be understood that not necessarily all such aspects, advantages or features will be embodied in any particular embodiment of the disclosure.

BRIEF DESCRIPTION OF THE DRAWINGS

A general architecture that implements the various features of the disclosure will now be described with reference to the drawings. The drawings and the associated descriptions are provided to illustrate embodiments of the invention and not to limit the scope of the invention.

DETAILED DESCRIPTION OF CERTAIN PREFERRED EMBODIMENTS

Figure 1:
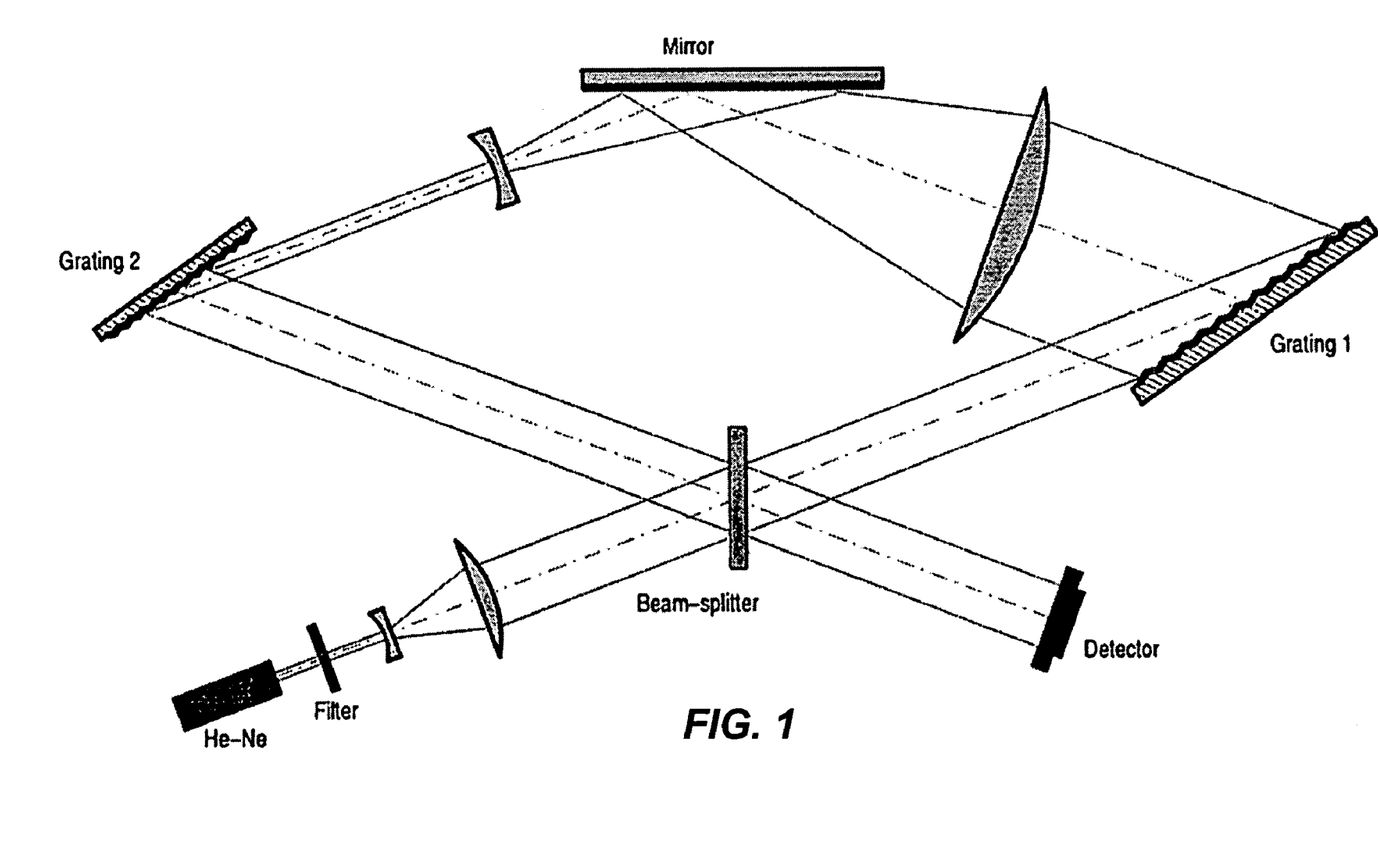
FIG. 1 illustrates a two-grating Sagnac interferometer including a beam expander, according to an embodiment of the disclosure.

The resolution of the traditional, non-dispersive Sagnac interferometer is limited by the Nyquist frequency of the detector array. To increase the resolution, embodiments of the present disclosure include a modified Sagnac interferometer with internal dispersion and one or more (preferably two) gratings replacing one (or preferably two) of the mirrors. An embodiment of the basic configuration is illustrated in FIG. 1. The introduction of the highly dispersive components improves the resolution dramatically. The theoretical resolution can approach about 0.6 GHz at about 632.8 nm ($\lambda/\Delta\lambda=8.4\times10^5$) for the two-grating spectrometer. A beam expander is incorporated into the system in order to match the beam sizes and optimize the fringe contrast.

1. FUNDAMENTALS

Consider embodiments of the traditional Sagnac interferometer, the modified Sagnac interferometer with a single grating, and the modified Sagnac interferometer with two gratings. In the traditional box setup Sagnac, the optical beam is aligned when the mirror is set at 45°. When one of the mirrors is tilted by a small amount, the transmitted beam and the reflected beam will subtend small angle at the output field. The detector records the interferogram of these two beams and the spectrum of the light source is then obtained by fast Fourier transform of the fringe pattern because there is a simple linear one to one relationship between the optical frequency of the source and the spatial frequency of the interferogram. However, the discrete sampling property of the detector array determines that the detector records the interferogram with spatial frequency from zero to the Nyquist frequency of the detector array, which corresponds to zero and a certain upper limit of optical frequency. This is a big range. However, the wavelength of interest is usually just a small part of the full spectrum range, thus, in some systems most of the available detection ability is wasted.

Figure 2:
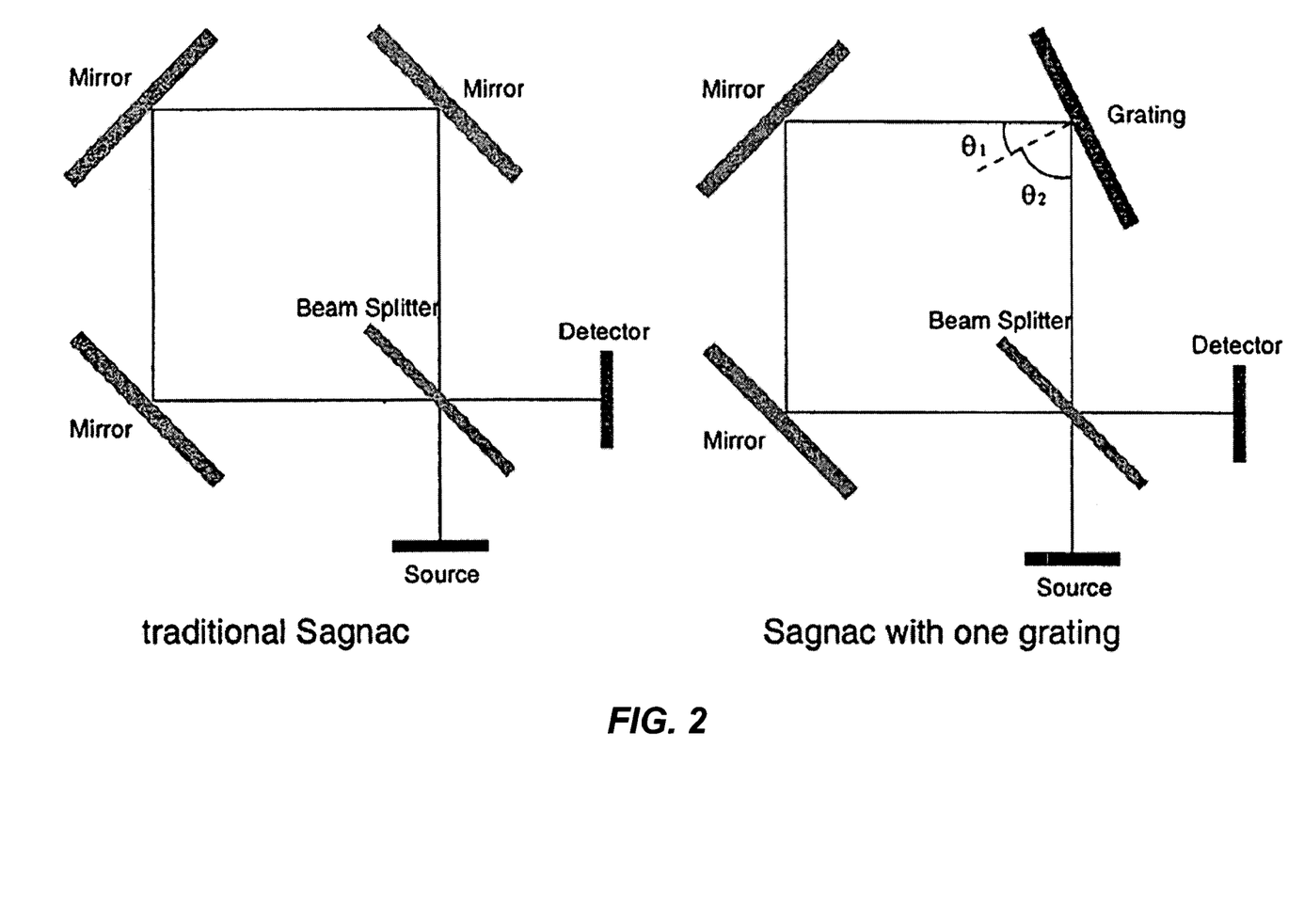
FIG. 2 illustrates a system configuration with one grating, according to an embodiment of the disclosure.

To make use of the available spatial spectrum range, an embodiment inserts one grating in place of one of the mirrors in the Sagnac interferometer (FIG. 2). Due to the dispersion of the grating, the relationship between the spatial frequency and the optical frequency becomes more complicated and strongly depends on the wavelength. Essentially, by aligning the grating to the upper limit of the optical frequency of interest, a large optical frequency can be translated to a zero spatial frequency, and nearby optical frequencies with longer wavelengths are heterodyned to non-zero spatial frequencies with high resolution. The parameters can be chosen carefully so that the optical spectrum range of interest is spread substantially uniformly within the available spatial spectrum range, such that the optical spectrum range of interest is isolated and a much higher resolution is achieved.

Following this method, an even higher resolution can be achieved by using additional gratings, such as, for example, two gratings. Each of the reflected and transmitted beam paths then sees two gratings in series. Since the angle of the diffracted beam at the second grating depends on both the wavelength and angle of the incident beam; the proper choice of geometry for both gratings can superpose these two effects constructively and thus greatly enhance the resolution.

2. SINGLE GRATING

2.1 Grating Equation

The grating equation comprises:

$$\sin\theta_q = \sin\theta_i + q\frac{\lambda}{d} \quad (1)$$

where $\theta_q$, $\theta_i$ are the directions of the $q^{th}$ order diffracted wave and the incident wave respectively, d is the groove spacing, $\lambda$ is the wavelength. Here, one may assume all waves are plane waves. To get the direction of the diffraction for a slightly different wavelength, differentiate equation (1) to $$\cos\theta_q d\theta_q = \cos\theta_i d\theta_i + q\frac{d\lambda}{d} \quad (2)$$

Assume substantially perfect alignment of the interferometer for $\lambda_0$ (see FIG. 2). For the wavelength $\lambda=\lambda_0+\Delta\lambda$, the incidence angles stay unchanged ($\Delta\theta_i=0$) and the diffraction angles are slightly different from the original angles.

For the beam which is reflected at the beam-splitter, $\theta_i=\theta_1$, $\theta_q=\theta_2$, the order of diffraction=q, then $$\cos\theta_2 \Delta\theta_q^{(R)} = q\frac{\Delta\lambda}{d} \quad (3)$$

$$\Delta\theta_q^{(R)} = q\frac{\Delta\lambda}{d\cos\theta_2} \quad (4)$$

For the beam which is transmitted at the beam-splitter, $\theta_i=\theta_2$, $\theta_q=\theta_1$, the order of diffraction=−q, then $$\cos\theta_1 \Delta\theta_q^{(T)} = -q\frac{\Delta\lambda}{d} \quad (5)$$

$$\Delta\theta_q^{(T)} = -q\frac{\Delta\lambda}{d\cos\theta_1} \quad (6)$$

So, the angle between the reflected and transmitted beams is $$\Delta\theta_q = \Delta\theta_q^{(R)} - \Delta\theta_q^{(T)} = \frac{q\Delta\lambda}{d}\left(\frac{1}{\cos\theta_1} + \frac{1}{\cos\theta_2}\right) \quad (7)$$

2.2 Interference Between Two Plane Waves

There are two plane waves with the same or similar wavelength and amplitudes propagating in x-z plane. In an embodiment, when one ignores the amplitude part, the electric fields can be written as $$E_1 = e^{j[\omega t - (kx \sin \Delta\theta_1 + kz \cos \Delta\theta_1)]} \quad (8)$$

$$E_2 = e^{j[\omega t - (kx \sin \Delta\theta_2 + kz \cos \Delta\theta_2)]} \quad (9)$$

where $\Delta\theta_1$, $\Delta\theta_2$ are the angles between the directions of the propagation and z axis.

When one chooses z=0 at the detector plane, then the interference field is $$E = E_1 + E_2 = e^{j[\omega t - kx \sin \Delta\theta_1]} + e^{j[\omega t - kx \sin \Delta\theta_2]} \quad (10)$$

The intensity at the detector plane $$I \propto |E|^2 = E^*E = 2\{1 + \cos[kx(\sin \Delta\theta_1 - \sin \Delta\theta_2)]\} \quad (11)$$

Subtracting the mean value from the intensity allows one to ignore the DC component.

$$f(x) = \cos[kx(\sin\Delta\theta_1 - \sin\Delta\theta_2)] \quad (12)$$

$$= \frac{1}{2}[e^{jkx(\sin\Delta\theta_1 - \sin\Delta\theta_2)} + e^{-jkx(\sin\Delta\theta_1 - \sin\Delta\theta_2)}]$$

The Fourier transform of f(x) is $$F(\sigma) = \frac{1}{2}\left\{\delta\left[\sigma - \frac{1}{\lambda}(\sin\Delta\theta_1 - \sin\Delta\theta_2)\right] + \delta\left[\sigma + \frac{1}{\lambda}(\sin\Delta\theta_1 - \sin\Delta\theta_2)\right]\right\} \quad (13)$$

Where $\sigma$ is the spatial frequency of the interferogram.

If $\Delta\theta_1, \Delta\theta_2 \ll 1$, then $\sin \Delta\theta_1 \approx \Delta\theta_1$, $\sin \Delta\theta_2 \approx \Delta\theta_2$. The equation (13) becomes $$F(\sigma) = \frac{1}{2}\left\{\delta\left[\sigma - \frac{1}{\lambda}(\Delta\theta_1 - \Delta\theta_2)\right] + \delta\left[\sigma + \frac{1}{\lambda}(\Delta\theta_1 - \Delta\theta_2)\right]\right\} \quad (14)$$

With $\Delta\theta_1=\Delta\theta_q^{(R)}$, $\Delta\theta_2=\Delta\theta_q^{T}$, using equation (4), (6), then (14) becomes $$F(\sigma) = \frac{1}{2}\left\{\delta\left[\sigma - \frac{q\Delta\lambda}{\lambda d}\left(\frac{1}{\cos\theta_1} + \frac{1}{\cos\theta_2}\right)\right] + \delta\left[\sigma + \frac{q\Delta\lambda}{\lambda d}\left(\frac{1}{\cos\theta_1} + \frac{1}{\cos\theta_2}\right)\right]\right\} \quad (15)$$

If there are two lines with wavelength difference $\Delta\lambda$, to the first order approximation, the separation in $\sigma$ space is $$\Delta\sigma = \frac{q\Delta\lambda}{\lambda_0 d}\left(\frac{1}{\cos\theta_1} + \frac{1}{\cos\theta_2}\right) \quad (16)$$

2.3 Non-Ideal Interferogram
2.3.1 Finite Length of Detector

Consider the fact that the length of the detector is finite. If the length of the detector is a, the detected signal will be the product of the top-hat function and the interferogram:

$$s(x) = Rect\left(\frac{x}{a}\right) \cdot f(x) \quad (17)$$

The Fourier transform of $s(x)$ is the convolution of the sin c function and $F(\sigma)$:

$$S(\sigma) = |a| \cdot sinc(a\sigma) * F(\sigma) \quad (18)$$

$$= \frac{|a|}{2}\left\{sinc(a\sigma) * \delta\left[\sigma - \frac{1}{\lambda}(\sin\Delta\theta_1 - \sin\Delta\theta_2)\right] + sinc(a\sigma) * \delta\left[\sigma + \frac{1}{\lambda}(\sin\Delta\theta_1 - \sin\Delta\theta_2)\right]\right\}$$

$$= \frac{|a|}{2}\left\{sinc(a\sigma) * \delta\left[\sigma - \frac{q\Delta\lambda}{\lambda d}\left(\frac{1}{\cos\theta_1} + \frac{1}{\cos\theta_2}\right)\right] + sinc(a\sigma) * \delta\left[\sigma + \frac{q\Delta\lambda}{\lambda d}\left(\frac{1}{\cos\theta_1} + \frac{1}{\cos\theta_2}\right)\right]\right\}$$

2.3.2 Finite Entrance Aperture (Slit) Size

Since the width of the slit is finite, the incident beam is not perfectly collimated. There is an angular distribution. So, $\Delta\theta_i$ in equation (2) is no longer zero. Let $\Delta\theta_i=\alpha$, then the equation (2) becomes $$\cos\theta_2\Delta\theta_q^{(R)} = \alpha\cos\theta_1 + q\frac{\Delta\lambda}{d} \quad \text{for reflected beam} \quad (19)$$

$$\cos\theta_1\Delta\theta_q^{(T)} = \alpha\cos\theta_2 - q\frac{\Delta\lambda}{d} \quad \text{for transmitted beam}$$

The angle between the reflected and transmitted beam is $$\Delta\theta_q = \Delta\theta_q^{(R)} - \Delta\theta_q^{(T)} \quad (20)$$

$$= \left(\frac{\cos\theta_2}{\cos\theta_1} - \frac{\cos\theta_1}{\cos\theta_2}\right)\alpha + \frac{q\Delta\lambda}{d}\left(\frac{1}{\cos\theta_1} + \frac{1}{\cos\theta_2}\right)$$

The fringe pattern (DC component subtracted) caused by the incident wave at angle $\alpha$ is $$d[f(x)] = \cos[kx(\sin\Delta\theta_q^{(R)} - \sin\Delta\theta_q^{(T)})]d\alpha \quad (21)$$

$$\simeq \cos(kx\Delta\theta_q)d\alpha$$

$$= \cos\left\{kx\left[\left(\frac{\cos\theta_2}{\cos\theta_1} - \frac{\cos\theta_1}{\cos\theta_2}\right)\alpha + \frac{q\Delta\lambda}{d}\left(\frac{1}{\cos\theta_1} + \frac{1}{\cos\theta_2}\right)\right]\right\}d\alpha$$

$$= \frac{1}{2}\left\{e^{jkx\left[\left(\frac{\cos\theta_2}{\cos\theta_1} - \frac{\cos\theta_1}{\cos\theta_2}\right)\alpha + \frac{q\Delta\lambda}{d}\left(\frac{1}{\cos\theta_1} + \frac{1}{\cos\theta_2}\right)\right]} + c.c.\right\}d\alpha$$

Integrate equation (21), and get the fringe pattern that is caused by all waves in the angle range $[-\alpha_m, \alpha_m]$.

$$f(x) = \int_{-\alpha_m}^{\alpha_m} \frac{1}{2}\left\{e^{jkx\left[\left(\frac{\cos\theta_2}{\cos\theta_1} - \frac{\cos\theta_1}{\cos\theta_2}\right)\alpha + \frac{q\Delta\lambda}{d}\left(\frac{1}{\cos\theta_1} + \frac{1}{\cos\theta_2}\right)\right]} + c.c.\right\}d\alpha = \quad (22)$$

$$\alpha_m sinc\left[\frac{2\alpha_m x}{\lambda}\left(\frac{\cos\theta_2}{\cos\theta_1} - \frac{\cos\theta_1}{\cos\theta_2}\right)\right] \cdot e^{jkx\frac{q\Delta\lambda}{d}\left(\frac{1}{\cos\theta_1} + \frac{1}{\cos\theta_2}\right)} + c.c.$$

The Fourier transform is $$F(\sigma) = \left|\frac{\lambda}{2\left(\frac{\cos\theta_2}{\cos\theta_1} - \frac{\cos\theta_1}{\cos\theta_2}\right)}\right| \cdot \left\{rect\cdot\left(\frac{\lambda}{2\alpha_m\left(\frac{\cos\theta_2}{\cos\theta_1} - \frac{\cos\theta_1}{\cos\theta_2}\right)}\sigma\right) * \right. \quad (23)$$

$$\delta\left[\sigma - \frac{q\Delta\lambda}{\lambda d}\left(\frac{1}{\cos\theta_1} + \frac{1}{\cos\theta_2}\right)\right] + rect\left(\frac{\lambda}{2\alpha_m\left(\frac{\cos\theta_2}{\cos\theta_1} - \frac{\cos\theta_1}{\cos\theta_2}\right)}\sigma\right) *$$

$$\left.\delta\left[\sigma + \frac{q\Delta\lambda}{\lambda d}\left(\frac{1}{\cos\theta_1} + \frac{1}{\cos\theta_2}\right)\right]\right\}$$

2.4 Box Sagnac Interferometer
2.4.1 Resolution Vs. Groove Density

In the discussion of FIG. 2, $\theta_1+\theta_2=90°$, so $\cos\theta_2=\sin\theta_1$. The separation of spatial frequencies between two lines with wavelength difference $\Delta\lambda$:

$$\Delta\sigma = \frac{q\Delta\lambda}{\lambda d}\left(\frac{1}{\sin\theta_1} + \frac{1}{\cos\theta_1}\right) \quad (24)$$

From the grating equation $$\sin\theta_2 - \sin\theta_1 = \cos\theta_1 - \sin\theta_1 = \frac{q\lambda}{d} \quad (25)$$

and $$\sin^2\theta_1 + \cos^2\theta_1 = 1 \quad (26)$$

one gets $$\theta_1 = \frac{1}{2}\sin^{-1}\left(1 - \frac{q^2\lambda^2}{d^2}\right) \quad (27)$$

Figure 3:
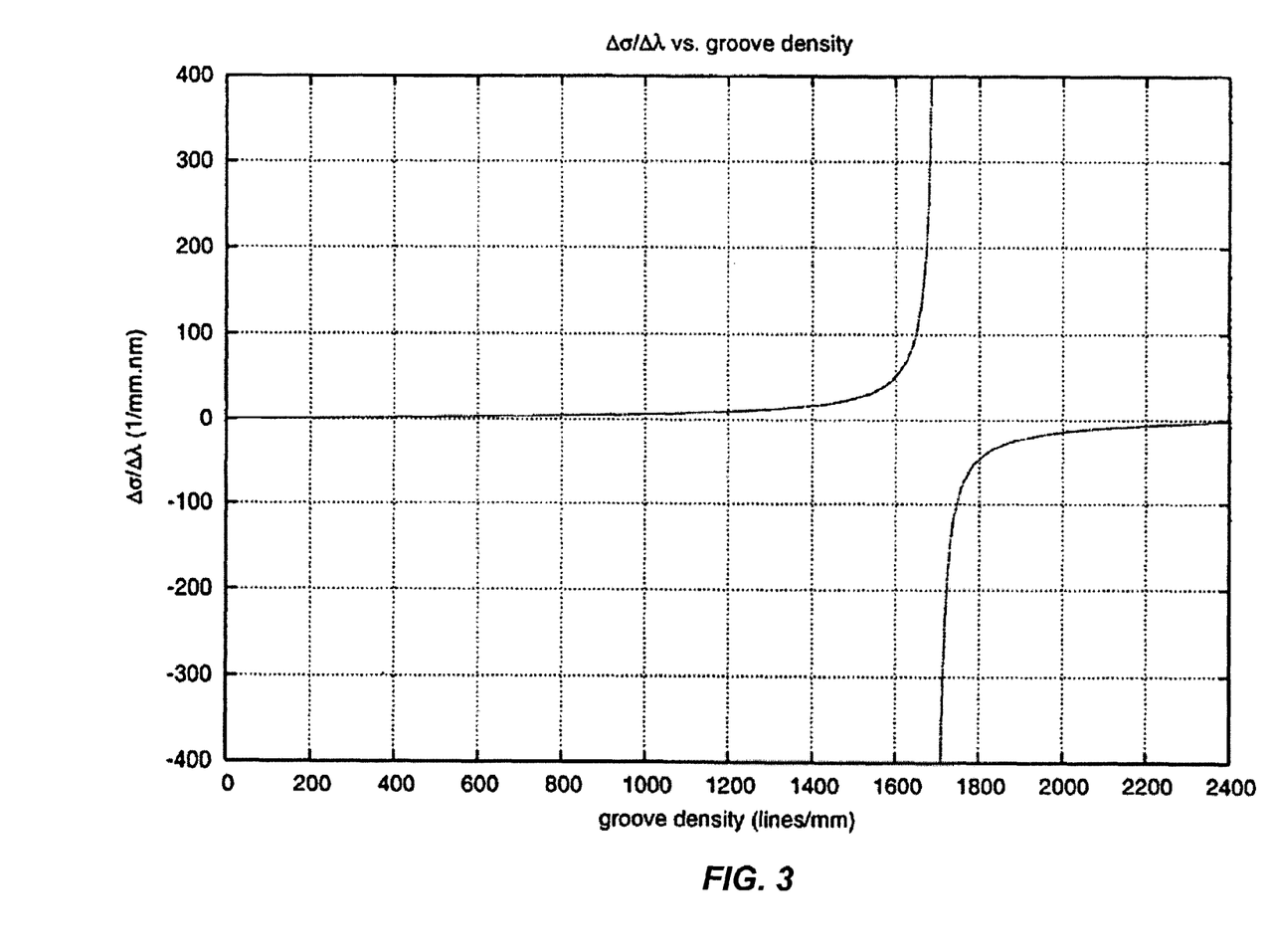
FIG. 3 illustrates a relationship between $\Delta\sigma$ and the groove density, according to an embodiment of the disclosure.

The relationship between $\Delta\sigma$ and the groove density $1/d$ is shown in FIG. 3, in which $\lambda$=about 589.0 nm (sodium yellow line), q=about 1.

The groove density is confined by equation (27). From $$\left|1 - \frac{q^2\lambda^2}{d^2}\right| \leq 1$$

we get $$\frac{q}{d} \leq 2401 \text{ lines/mm} \tag{28}$$

Figure 4:
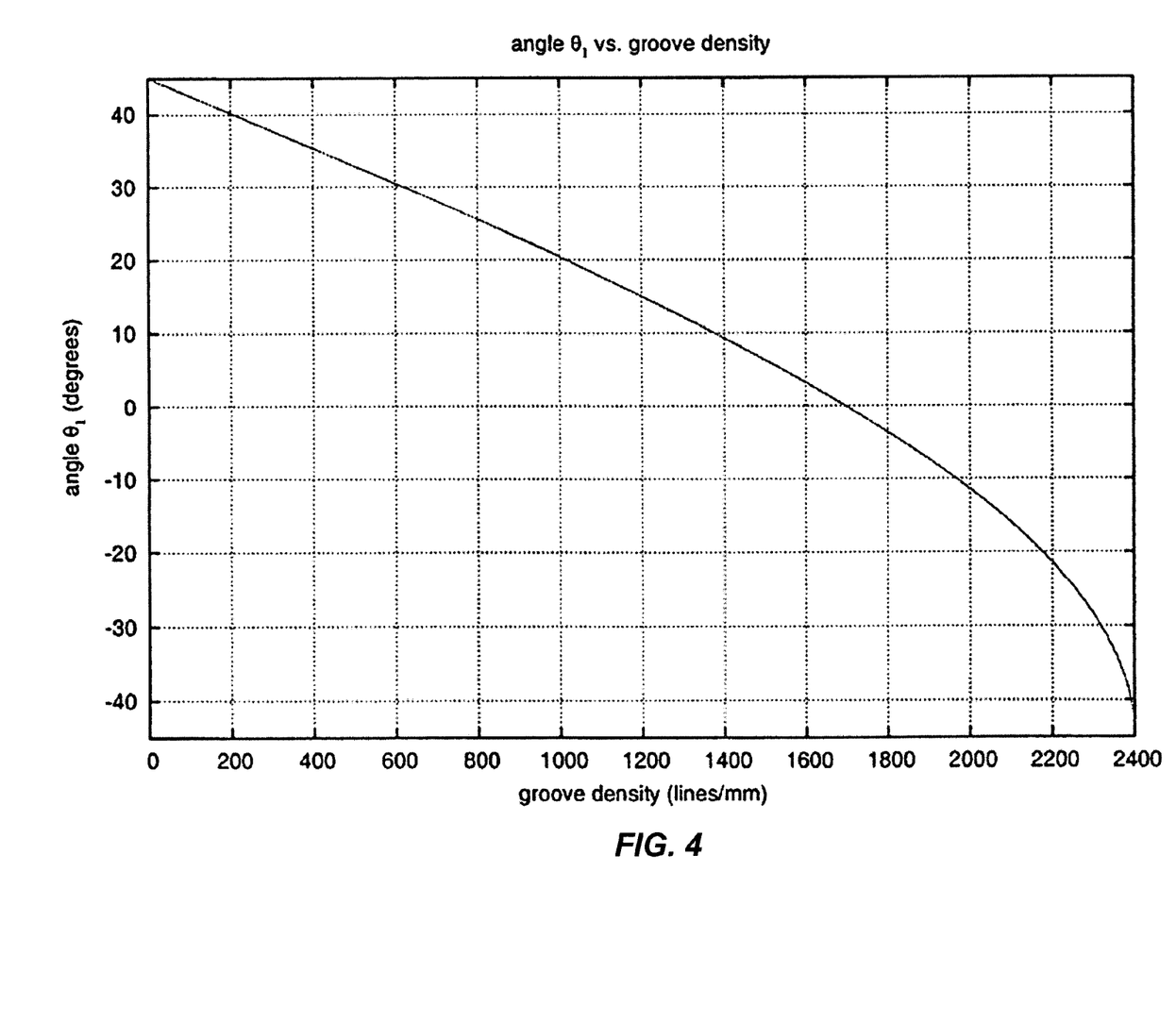
FIG. 4 illustrates a relationship between angle $\theta_1$ and the groove density, according to an embodiment of the disclosure.

So, the resolution only depends on the ratio $q/d$. It does not matter to use $1^{st}$ order or higher order diffraction. The relationship between angle $\theta_1$ and the groove density is shown in FIG. 4.

The resolution is maximized at about $1/d$=about 1700 lines/mm. However, this angle is so small that this shallow incidence system may not be realized physically. 15°~30° is a good range for the balance between high resolution and reality, although a broader range is possible.

2.4.2 Resolution in a Specific Example

In a particular embodiment, the detector is a 512×512 CCD array, and the pixel size is 20×20 μm. The Nyquist frequency is $$\sigma_{Nyquist} = \frac{1}{2} \times \frac{1}{20\mu m} = 25\text{mm}^{-1} \tag{29}$$

So, one small spatial frequency interval that the detector can resolve is $$\frac{\sigma_{Nyquist}}{256}.$$

From equation (24), we can get the resolution $$\frac{\lambda}{\Delta\lambda} = \frac{256}{\sigma_{Nyquist}} \cdot \frac{q}{d}\left(\frac{1}{\sin\theta_1} + \frac{1}{\cos\theta_1}\right) \tag{30}$$

Figure 5:
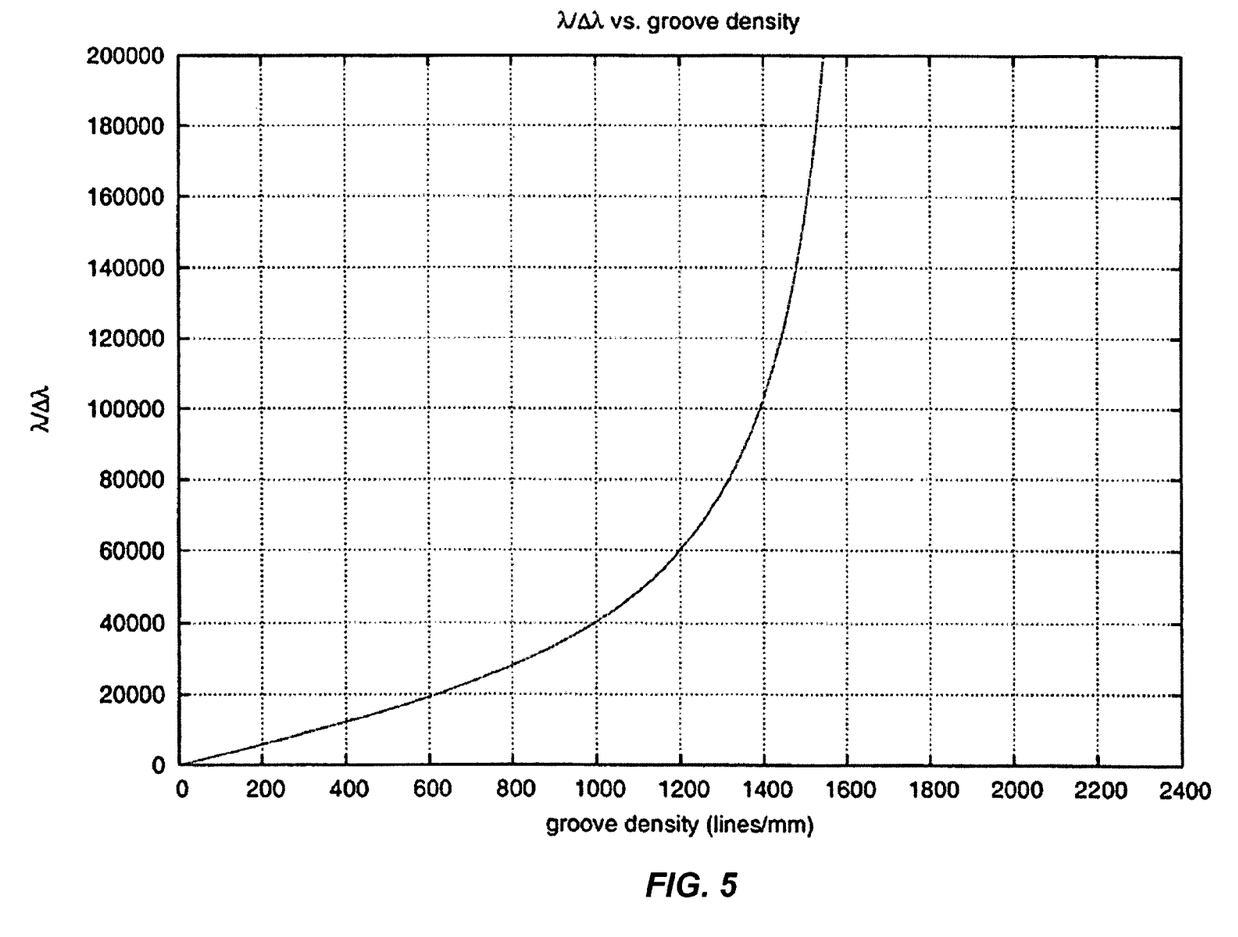
FIG. 5 illustrates a relationship between $\lambda/\Delta\lambda$ and the groove density at about 589 nm, according to an embodiment of the disclosure.
Figure 6:
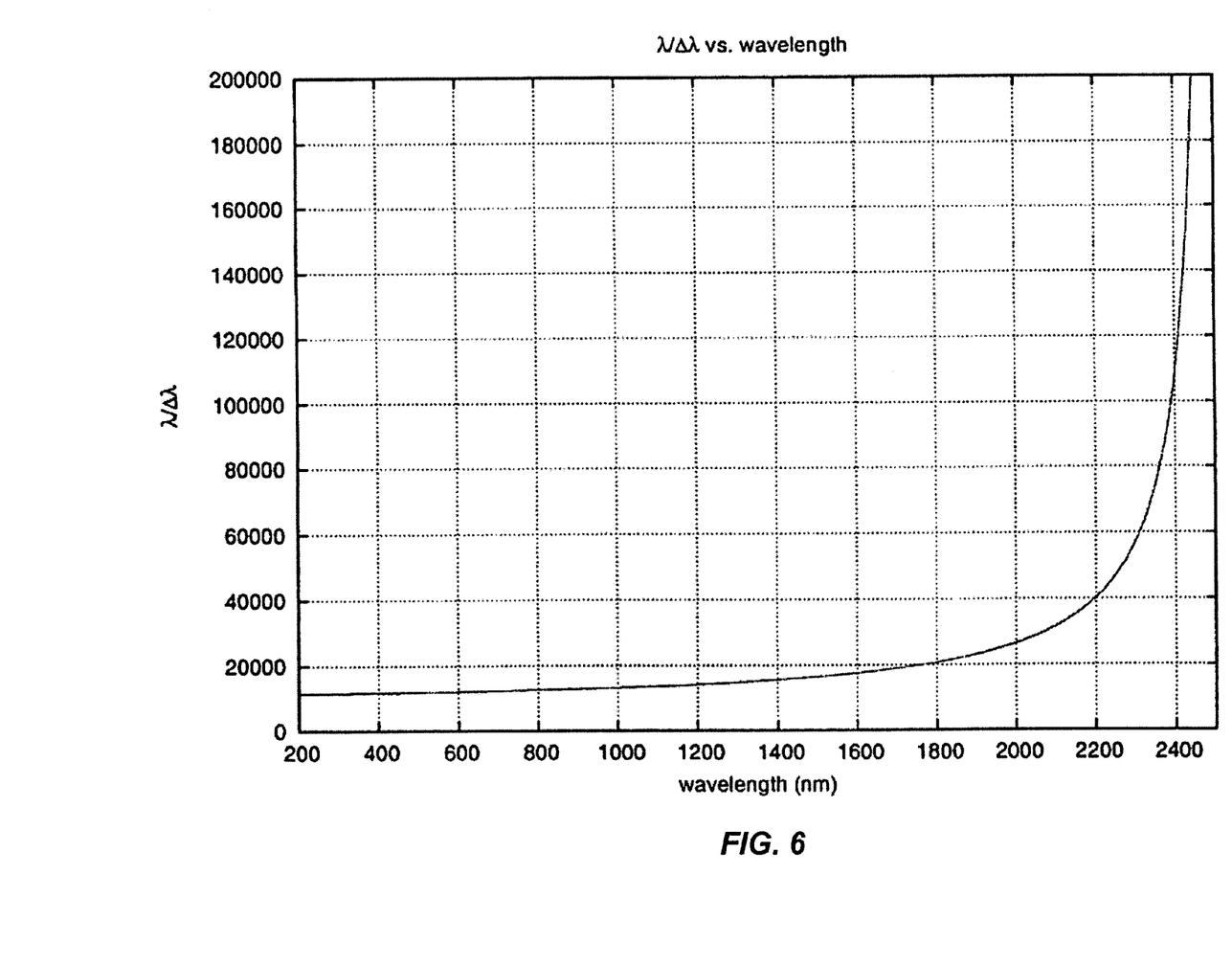
FIG. 6 illustrates a relationship between $\lambda/\Delta\lambda$ and wavelength at the groove density at about 400 lines/mm, according to an embodiment of the disclosure.

The resolution curves are shown in FIGS. (5)~(6).

3. DOUBLE GRATING

3.1 New Layout

Figure 7:
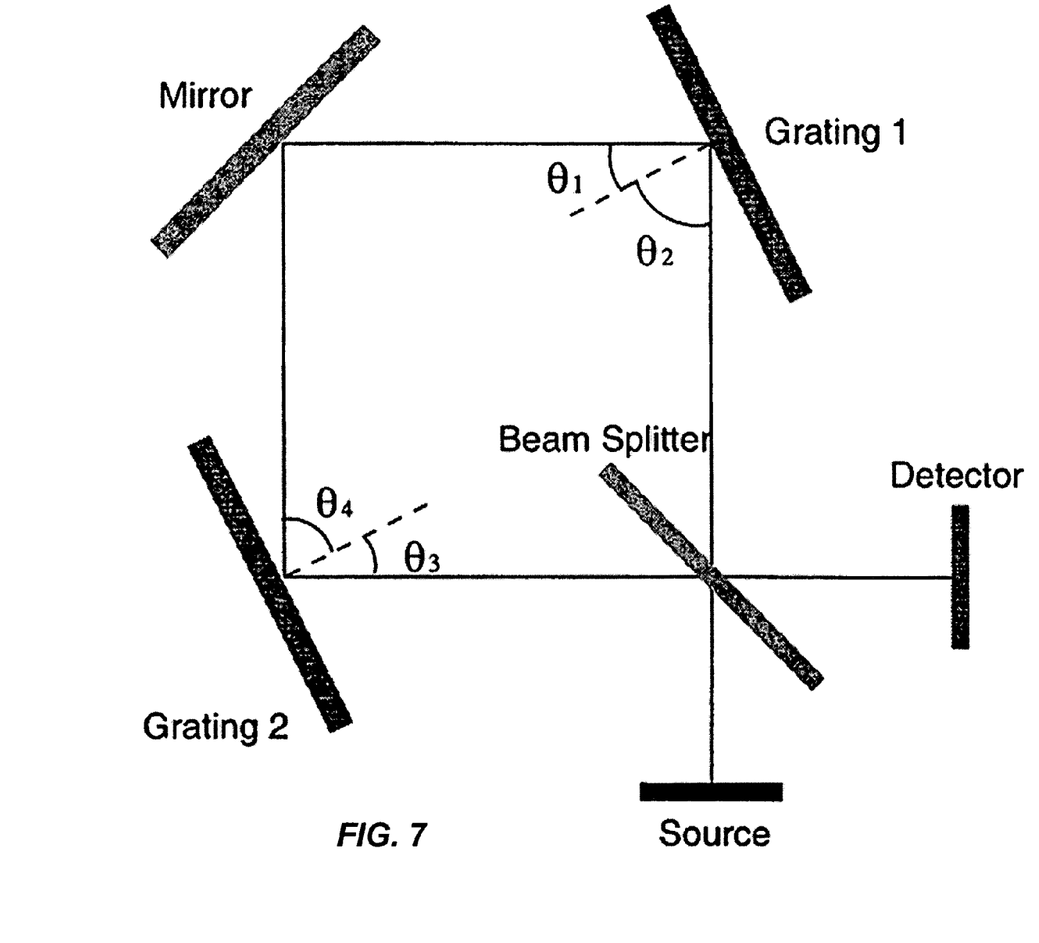
FIG. 7 illustrates a layout of another system, according to an embodiment of the disclosure.

Introducing a grating into the Sagnac interferometer results in a much higher resolution, and the size of the system is still very compact. Some embodiments seek even higher resolution, by, for example, replacing one of the mirrors by a grating, such as, for example, the layout shown in FIG. 7.

3.2 Modified Formulas

In this new layout, the analysis is similar to that of Section 2.1. For simplicity, assume that the two gratings are identical at this point, so, in FIG. 7, $\theta_1 = \theta_3$, $\theta_2 = \theta_4$. Then, the equations (4), (6), (7) become $$\Delta\theta_q^{(R)} = q\frac{\Delta\lambda}{d}\left(\frac{\cos\theta_1}{\cos\theta_2} + 1\right)\frac{1}{\cos\theta_2} \tag{31}$$

$$\Delta\theta_q^{(T)} = -q\frac{\Delta\lambda}{d}\left(\frac{\cos\theta_2}{\cos\theta_1} + 1\right)\frac{1}{\cos\theta_1} \tag{32}$$

$$\Delta\theta_q = \Delta\theta_q^{(R)} - \Delta\theta_q^{(T)}$$

$$= q\frac{\Delta\lambda}{d}(\cos\theta_1 + \cos\theta_2)\left(\frac{1}{\cos^2\theta_1} + \frac{1}{\cos^2\theta_2}\right) \tag{33}$$

To get other results, replace the factor $$\left(\frac{1}{\cos\theta_1} + \frac{1}{\cos\theta_2}\right)$$

in those equations by the new factor $$(\cos\theta_1 + \cos\theta_2)\left(\frac{1}{\cos^2\theta_1} + \frac{1}{\cos^2\theta_2}\right).$$

Let $\theta_1 + \theta_2 = 90°$, then equation (33) becomes $$\Delta\theta_q = q\frac{\Delta\lambda}{d} \cdot \frac{\sin\theta_1 + \cos\theta_1}{\sin^2\theta_1 \cos^2\theta_1} \tag{34}$$

The equation (27) still holds. For the specific example in Section 3.4.2, the resolution (30) becomes $$\frac{\lambda}{\Delta\lambda} = \frac{256}{\sigma_{Nyquist}} \cdot \frac{q}{d} \cdot \frac{\sin\theta_1 + \cos\theta_1}{\sin^2\theta_1 \cos^2\theta_1} \tag{35}$$

$$= q\frac{L}{d} \cdot \frac{\sin\theta_1 + \cos\theta_1}{\sin^2\theta_1 \cos^2\theta_1} \tag{36}$$

where L=512×20 μm is the length of the detector array.

Figure 8:
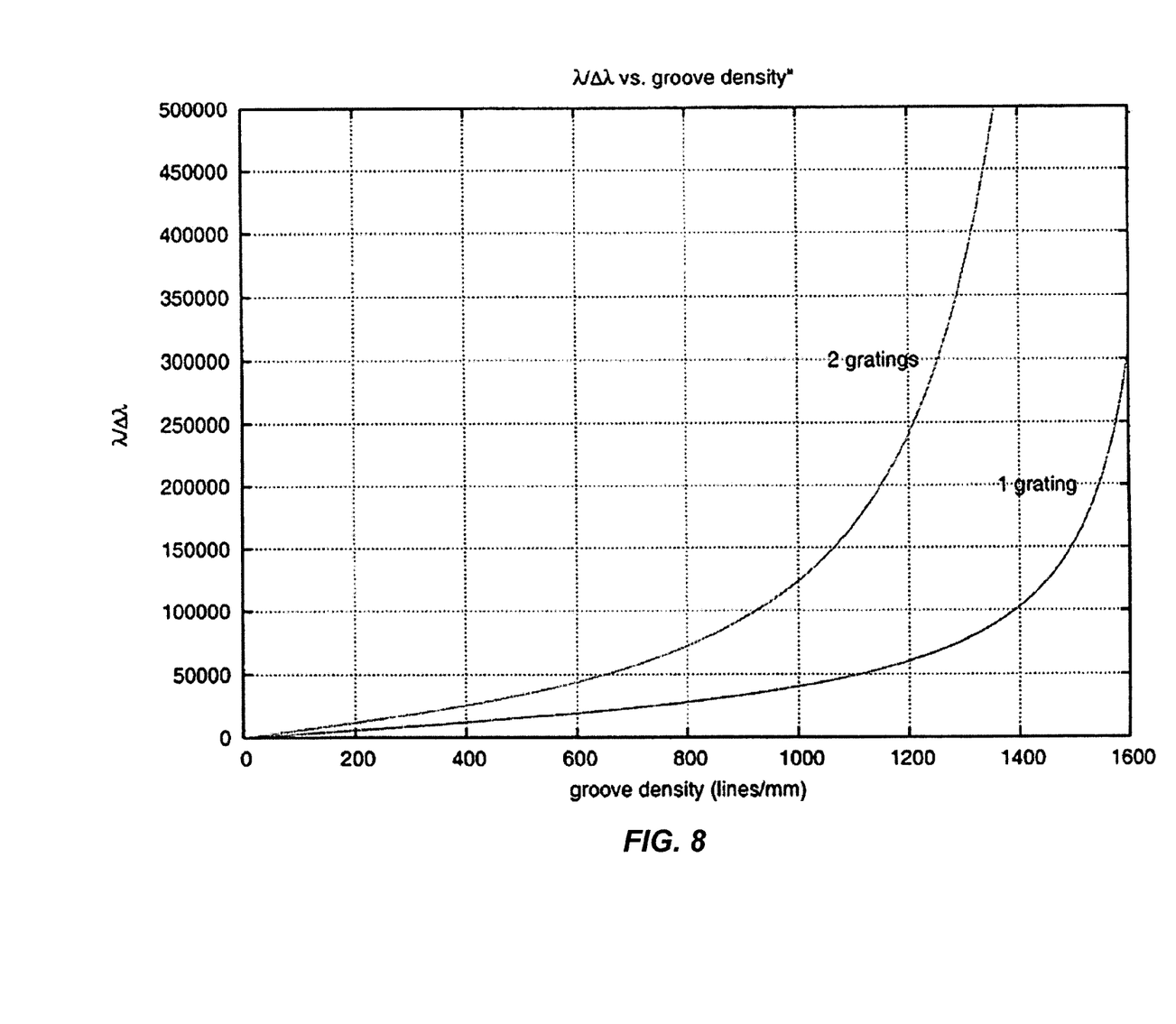
FIG. 8 illustrates a relationship between $\lambda/\Delta\lambda$ and the groove density at about 589 nm, according to an embodiment of the disclosure.
Figure 9:
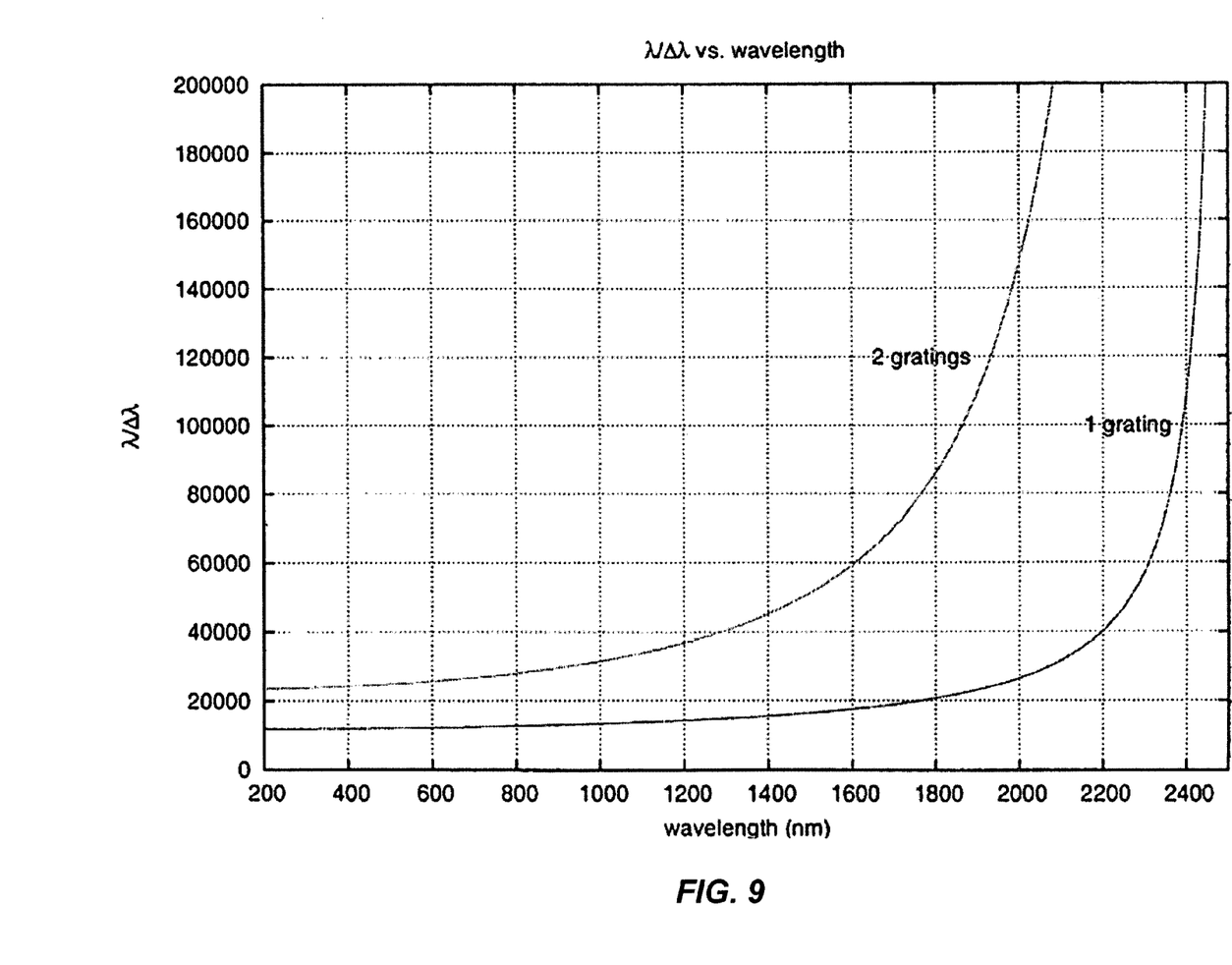
FIG. 9 illustrates a relationship between $\lambda/\Delta\lambda$ and wavelength at the groove density at about 400 lines/mm, according to an embodiment of the disclosure.

Compare these results to the results in Section 2.4.2. The resolution curves are shown in FIGS. (8) and (9). As shown, one additional grating increases the resolution significantly.

3.2 Beam Size Matching

Figure 10:
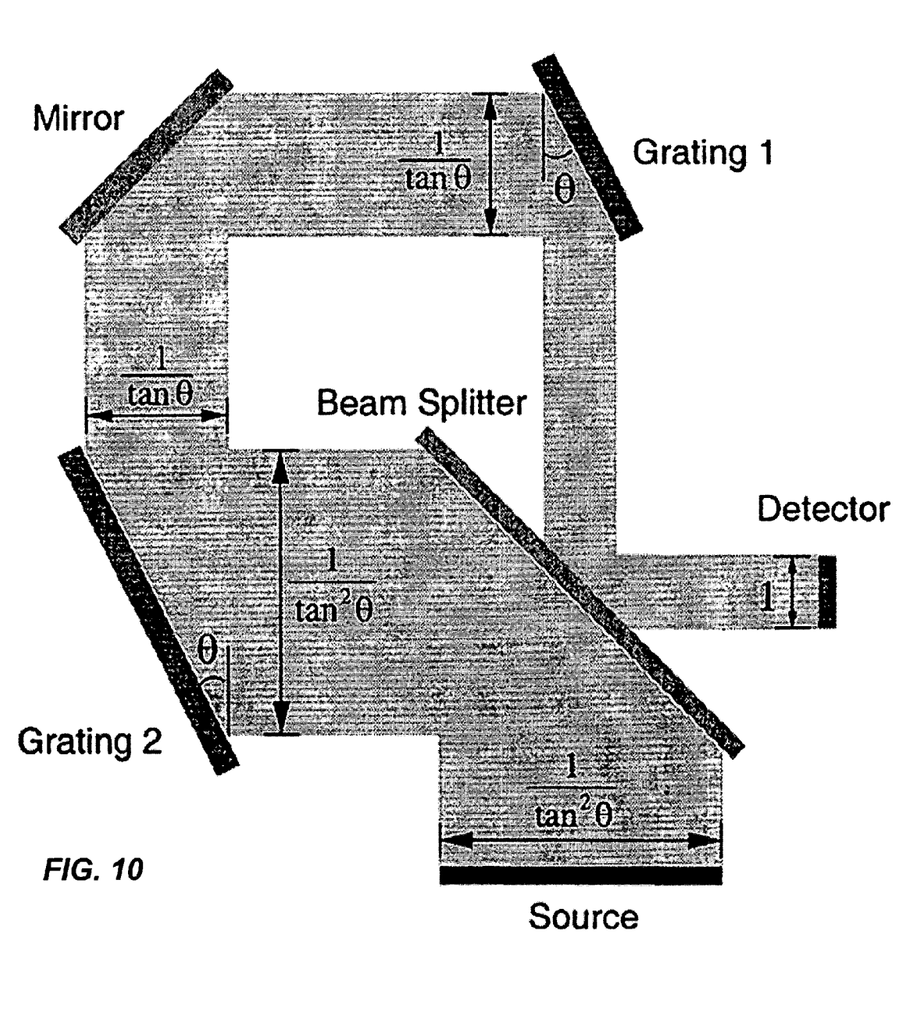
FIG. 10 illustrates a layout with beam size, according to an embodiment of the disclosure.

In the dispersively-modified Sagnac interferometers described above, the geometry of the gratings setup is not symmetric as in an interferometer using only mirrors. In a traditional Sagnac interferometer, the angle of reflection equals the angle of incidence, so the sizes of the input beam and output beam are the same. However, this is no longer true in our modified interferometer because the gratings are not arranged in the Littrow configuration. The beam size will be enlarged (or reduced) from input to output. Consequently, the sizes of the parts have to be enlarged. This problem actually occurs in both the one-grating and two-grating systems. The corresponding beam profiles are illustrated in FIG. 10 for the two-grating system.

In our example, the size of detector is about 10.24 mm, and the angle $\theta$=about 35.41°. In an embodiment, the input beam size is also at least about 20.3 mm.

As the design resolution increases, the angle $\theta$ decreases, and the sizes of the optical elements are increased. At a very high resolution, the optics could possibly be too big to manufacture. At the same time, the efficiency of the interferometer will become very low because the overlap area of the two beams becomes very small. Left uncompensated, this limitation may also limit the ultimate resolution of the spectrometer.

3.4 Solution

To solve this problem, incorporate a beam expander inside the interferometer (see FIG. 1). It will change the beam size for both propagation directions. Then, the input beam and the output beam have approximately the same size. The transmitted beam and the reflected beam will have a good overlap area at the detector plane.

In addition, some embodiments may relax the right angle geometry between the incident and diffracted beams at each grating. By increasing the difference between the incident angle and the diffraction angle on the grating, higher resolutions are attainable as long as the groove density is increased accordingly.

4. CONCLUSION

Single- and double-grating Sagnac Fourier transform spectrometer have been described. Unlike the conventional Fourier transform spectrometer, embodiments may have no scanning part. This makes the spectrometer very compact. Also, the use of the modified Sagnac interferometer with double-grating gives a very high resolution at this small size. Preliminary experiments have been performed using a single-grating Sagnac interferometer at about 589 nm wavelength. Double-grating systems at about 633 nm wavelengths provide a theoretical resolution of about 0.6 GHz. In addition, the field of view may be enhanced using prisms or other optics. The double-grating Sagnac Fourier transform spectrometer makes it possible to perform real time spectral analysis, which is important for applications in various areas such as remote sensing, process monitoring and basic research.

Figure 11:
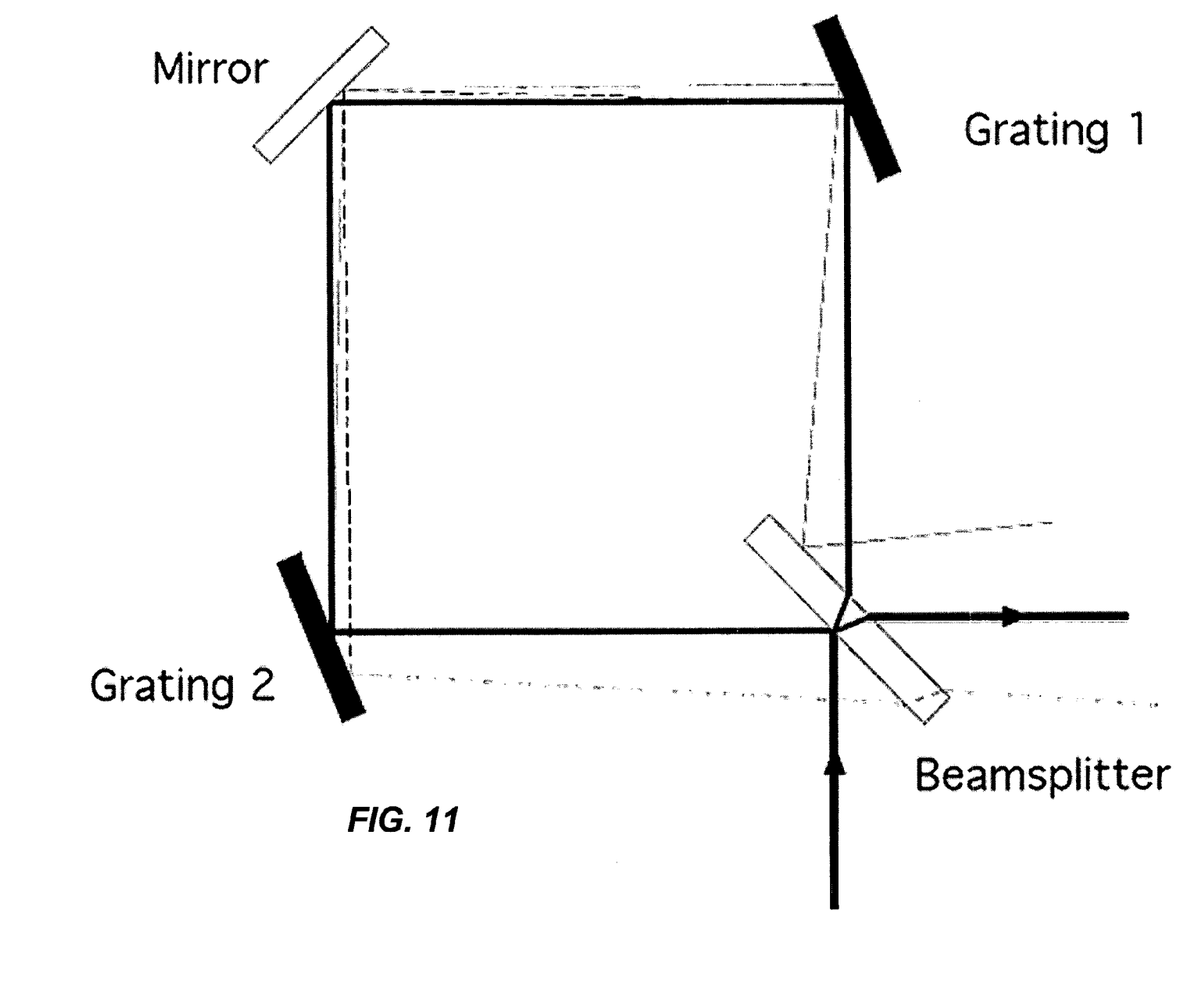
FIG. 11 illustrates a layout having the enhanced resolution obtained with two gratings in series and separated by a folding mirror, according to an embodiment of the disclosure.

Although the foregoing invention has been described in terms of certain preferred embodiments, other embodiments will be apparent to those of ordinary skill in the art from the disclosure herein. For example, consider FIGS. 11-13. FIG. 11 shows a schematic layout of the embodiment shown in FIG. 1 (without the beam expander lenses), illustrating the enhanced resolution obtained with two gratings in series and separated by a folding mirror. The bold solid line represents the perfectly aligned beam path for the design wavelength, such that the reflected (clockwise) and transmitted (counterclockwise) beams have zero crossing angle between them in the output beam path. The fine lines represent the clockwise beam (solid) and counterclockwise beam (dashed) for a wavelength shorter than the design wavelength. Consider the counterclockwise beam: at each of the gratings, the angle subtended by the incident and diffracted beams at the shorter wavelength is greater than at the design wavelength for the grating orientations shown. Due to the presence of the folding mirror, the angular dispersion imposed by grating 1 increases the angle of incidence at grating 2 and therefore also the angle of diffraction. This increase in the angle of diffraction adds to the dispersion of the second grating, thus increasing the output angle of the counterclockwise beam below the output axis as shown. A similar enhancement occurs for the clockwise beam, resulting in an increased output angle above the axis. The result is an enhanced crossing angle between the clockwise and counterclockwise output beams at the shorter wavelength.

Figure 12:
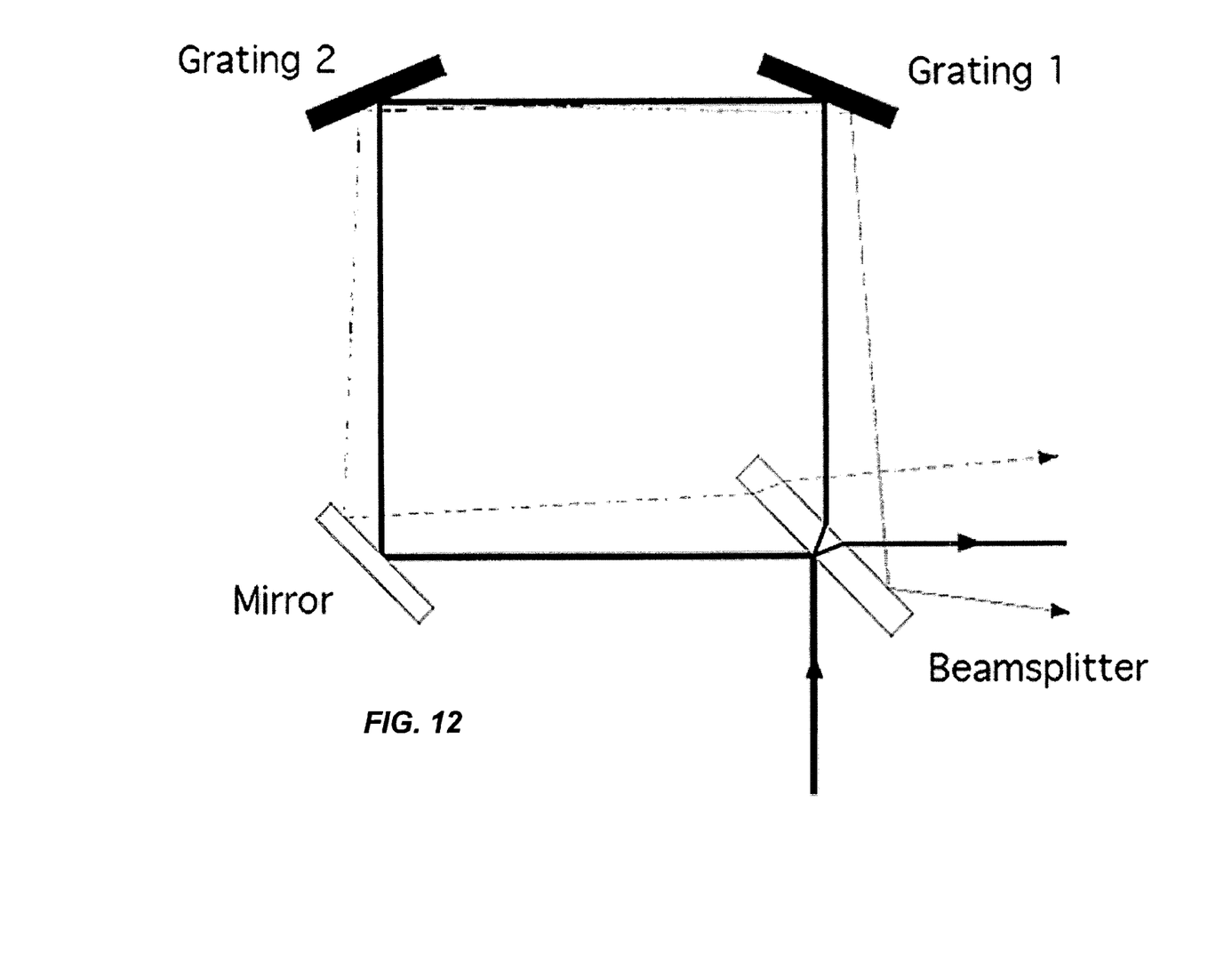
FIG. 12 illustrates a layout having the enhanced resolution obtained with two gratings in series and adjacent to each other in the beam path, according to an embodiment of the disclosure.

FIG. 12 illustrates the enhanced resolution obtained with two gratings in series and adjacent to each other in the beam path. Consider again the counterclockwise beam at the shorter wavelength (fine dashed line). By an analysis similar to that in FIG. 11, it can be seen that the angular dispersion imposed by grating 1 increases the angle of incidence at grating 2 and therefore also the angle of diffraction. This increase in the angle of diffraction adds to the dispersion of the second grating, thus increasing the output angle of the counterclockwise beam above the output axis as shown. A similar enhancement occurs for the clockwise beam, resulting in an increased output angle below the axis. The result is an enhanced crossing angle between the clockwise and counterclockwise output beams at the shorter wavelength.

Figure 13:
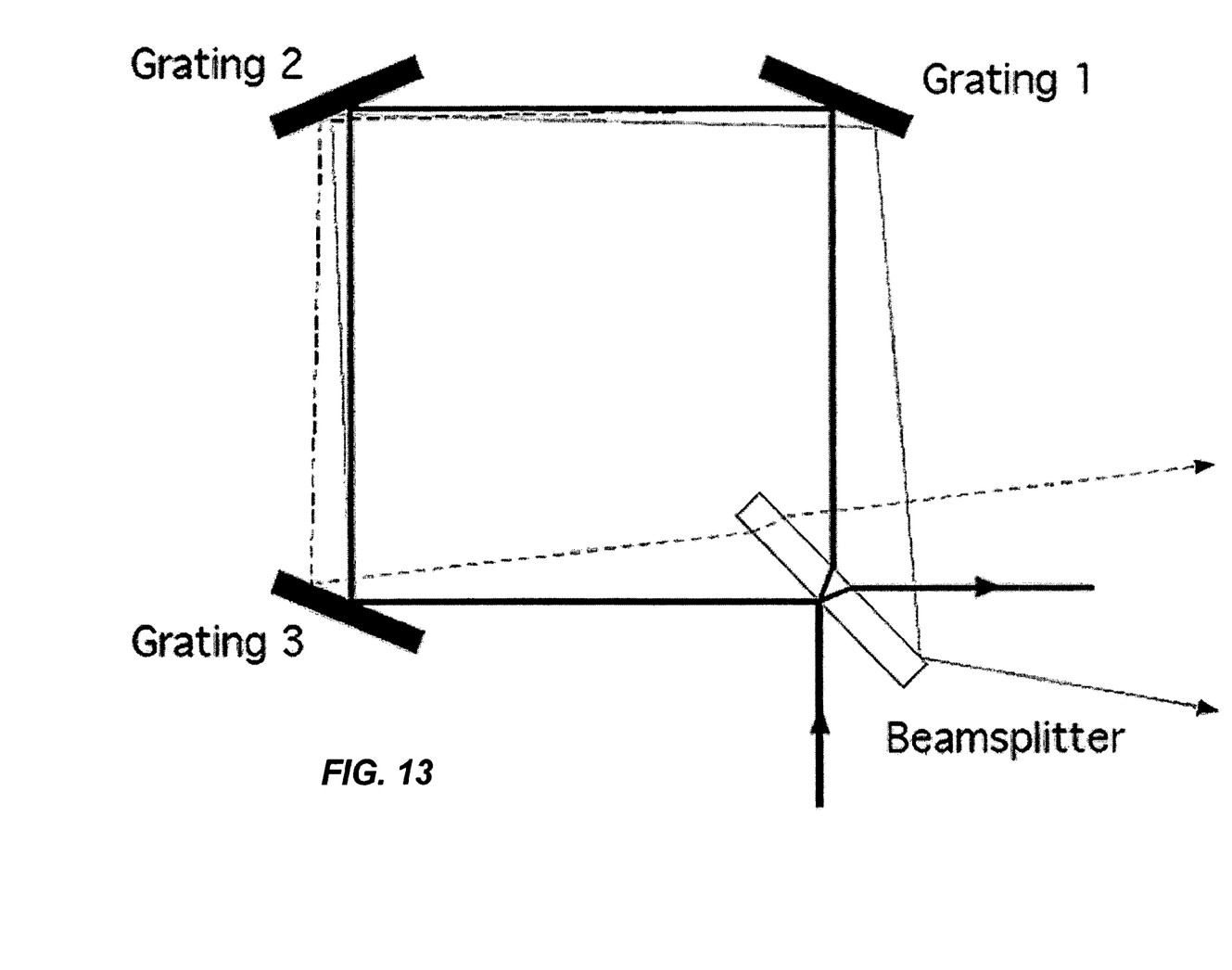
FIG. 13 illustrates a layout having the enhanced resolution obtained with three gratings in series and adjacent to each other in the beam path, according to an embodiment of the disclosure.

FIG. 13 illustrates the enhanced resolution obtained with three gratings in series and adjacent to each other in the beam path. Consider again the counterclockwise beam at the shorter wavelength (fine dashed line). By an analysis similar to that in FIG. 11, it can be seen that the angular dispersion imposed by grating 1 increases the angle of incidence at grating 2 and therefore also the angle of diffraction at grating 2. This increase in the angle of diffraction adds to the dispersion of the second grating, thus enhancing the overall angle of diffraction at the second grating. Now, the increased angle of diffraction from the second grating decreases the angle of incidence at grating 3 and therefore also the angle of diffraction at grating 3. But this decrease in the angle of diffraction again adds to the dispersion of the grating 3, thus enhancing yet again the overall angle of diffraction at grating 3 and increasing the output angle of the counterclockwise beam above the output axis as shown. A similar enhancement occurs for the clockwise beam, resulting in an increased output angle below the axis. The result is an enhanced crossing angle between the clockwise and counterclockwise output beams at the shorter wavelength.

Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. A Sagnac Fourier transform spectrometer comprising:
    a beamsplitter arranged to receive a substantially collimated input beam of light, split said input beam into first and second beams, and recombine said first and second beams into an output beam path;
    first and second diffraction gratings arranged with respect to said beamsplitter to form an optical path that extends from said beamsplitter to said first grating, from said first grating to said second grating, and from said second grating back to said beamsplitter, said first and second beams propagating clockwise and counter-clockwise, respectively, along said optical path, said first and second gratings each introducing angular dispersion into each of said clockwise and counter-clockwise beams; and
    a detector disposed in said output beam path to receive said clockwise and counter-clockwise propagating beams after being combined by said beamsplitter,
    wherein said first and second gratings are configured such that angular dispersion introduced by said first and second gratings together is greater than the angular dispersion introduced by either the first grating or the second grating individually, and said angular dispersion for said clockwise beam is in an opposite direction as said angular dispersion for said counter-clockwise beam.

2. The spectrometer of claim 1, wherein said first and second gratings are reflective.

3. The spectrometer of claim 1, further comprising a mirror disposed in said optical path.

4. The spectrometer of claim 3, wherein said mirror is disposed between said first and second gratings.

5. The spectrometer of claim 1, further comprising a beam expander that expands one of the first and second beams.

6. The spectrometer of claim 5, wherein said beam expander comprises a plurality of lenses.

7. The spectrometer of claim 6, wherein said plurality of lenses comprises a positive lens and a negative lens.

8. The spectrometer of claim 7, wherein said beam expander is substantially afocal.

9. The spectrometer of claim 8, further comprising a mirror disposed in the optical path between said first and second lenses.

10. The spectrometer of claim 1, further comprising processing electronics in communication with said detector.

11. The spectrometer of claim 1, wherein said detector comprises a two-dimensional detector array.

12. A method of obtaining spectral information of a substantially collimated input light beam, said method comprising:
   spitting said input light beam into first and second beams;
   propagating said first and second beams in opposite directions;
   diffracting said first beam from a first diffraction grating so as to introduce angular dispersion into said first beam;
   diffracting said first beam from a second diffraction grating so as to increase said angular dispersion of said first beam;
   diffracting said second beam from said second diffraction grating so as to introduce angular dispersion into said second beam;
   diffracting said second beam from said first diffraction grating so as to increase said angular dispersion of said second beam;
   combining said first and second beams;
   detecting interference fringes created by combining said beams; and
   determining said spectral information from said interference fringes.

13. The method of claim 12, wherein said determining step comprises performing a Fourier transform.

14. The method of claim 12, further comprising reducing said first beam between said first and second gratings.

15. A Sagnac Fourier transform spectrometer comprising:
   a beamsplitter arranged to receive a substantially collimated input beam of light, split said input beam into first and second beams, and recombine said first and second beams into an output beam path;
   a plurality of reflective and diffractive optical elements arranged with respect to said beamsplitter to form an optical path that extends from said beamsplitter to a first optical element of said plurality of reflective and diffractive optical elements, from said first optical element to a second optical element of said plurality of reflective and diffractive optical elements, to a third optical element of said plurality of reflective and diffractive optical elements, and from said third optical element to said beamsplitter, said first and second beams propagating clockwise and counter-clockwise, respectively, along said optical path, wherein at least some of said first, second, and third optical elements comprise diffractive optical elements and wherein said diffractive optical elements each introduce angular dispersion into each of said clockwise and counter-clockwise beams; and
   a detector disposed in said output beam path to receive said clockwise and counter-clockwise propagating beams after being combined by said beamsplitter,
   wherein said diffractive optical elements are configured such that angular dispersion introduced by said diffractive optical elements together is greater than the angular dispersion introduced by each of the diffractive optical elements individually, and said angular dispersion for said clockwise beam is in an opposite direction as said angular dispersion for said counter-clockwise beam so as to produce a substantial crossing angle between said clockwise and counter-clockwise beams after being recombined by said beamsplitter in said output beam path.

16. The spectrometer of claim 15, wherein said diffractive optical elements are diffraction gratings.

17. The spectrometer of claim 15, further comprising a mirror disposed in said optical path.

18. The spectrometer of claim 17, wherein said mirror is disposed between said diffractive optical elements.

19. A spectrometer comprising:
   a beamsplitter arranged to receive a substantially collimated input beam of light and split said input beam into first and second beams;
   first and second diffractive optical elements;
   at least one additional optical element;
   said first and second diffractive optical elements and said at least one additional optical element are arranged to form an optical path, wherein said first beam propagates clockwise along said optical path and said second beam propagates counter-clockwise along said optical path, at least said first and second diffractive optical elements introducing cumulative angular dispersion into said clockwise and counter-clockwise beams; and
   a detector disposed in said optical path to receive said clockwise and counter-clockwise beams.

20. The spectrometer of claim 19, wherein said first and second diffractive optical elements comprise diffraction gratings.

21. The spectrometer of claim 19, wherein said at least one additional optical element comprises a reflective element.

22. The spectrometer of claim 21, wherein said reflective element comprises a mirror.

23. The spectrometer of claim 21, wherein said optical path extends to said first diffractive optical element, then to said second diffractive optical element, then to said reflective element.

24. The spectrometer of claim 21, wherein said optical path extends to said first diffractive optical element, then to said reflective element, then to said second diffractive optical element.

25. The spectrometer of claim 19, wherein said at least one additional optical element comprises at least one additional diffractive optical element.

* * * * *